United States Patent
Suzaki

(10) Patent No.: US 11,647,372 B2
(45) Date of Patent: May 9, 2023

(54) INFORMATION PROCESSING APPARATUS THAT ESTABLISHES CONNECTION TO A COMMUNICATION APPATATUS, ENABLING A PREDETERMINED ACCESS POINT, CONTROL METHOD, AND NON-TRANSITORY COMPUTER-READABLE STORAGE MEDIUM STORING PROGRAM

(71) Applicant: CANON KABUSHIKI KAISHA, Tokyo (JP)

(72) Inventor: Ryo Suzaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 97 days.

(21) Appl. No.: 17/198,373

(22) Filed: Mar. 11, 2021

(65) Prior Publication Data
US 2021/0306943 A1    Sep. 30, 2021

(30) Foreign Application Priority Data

Mar. 24, 2020 (JP) ............................. JP2020-053140

(51) Int. Cl.
*G06F 3/12* (2006.01)
*H04W 4/80* (2018.01)
(Continued)

(52) U.S. Cl.
CPC ............ *H04W 4/80* (2018.02); *G06F 3/1204* (2013.01); *G06F 3/1236* (2013.01);
(Continued)

(58) Field of Classification Search
CPC .... G06F 3/1204; G06F 3/1236; G06F 3/1292; H04W 48/20; H04W 48/16; H04W 8/005
(Continued)

(56) References Cited

U.S. PATENT DOCUMENTS 9,042,940 B2 * 5/2015 Suzuki ................. H04W 8/245
358/1.15
9,629,077 B2   4/2017 Sumiuchi
(Continued)

FOREIGN PATENT DOCUMENTS

JP        2016-127545 A    7/2016

OTHER PUBLICATIONS

European Search Report dated Aug. 6, 2021, in related European Patent Application No. 21161936.6.

*Primary Examiner* — Haris Sabah
(74) *Attorney, Agent, or Firm* — Venable LLP

(57) ABSTRACT

An information processing apparatus executes, by a predetermined program, an instruction to an OS for connecting with a communication apparatus that has enabled a predetermined access point which includes identification information including both a specific character string and a character string other than the specific character string, and communicates, in a case in which a connection between the information processing apparatus and the communication apparatus that has enabled the predetermined access point is established by the instruction executed by designating a specific character string on the OS, by the predetermined program, information related to a different access point from the predetermined access point and is positioned outside the information processing apparatus and the communication apparatus. The information related to the different access point is communicated via the connection between the information processing apparatus and the communication apparatus that has enabled the predetermined access point.

20 Claims, 5 Drawing Sheets

(51) Int. Cl.
  *H04W 8/00* (2009.01)
  *H04N 1/00* (2006.01)
  *H04W 12/69* (2021.01)

(52) U.S. Cl.
  CPC .......... *G06F 3/1292* (2013.01); *H04W 8/005* (2013.01); *G06F 3/1209* (2013.01); *H04N 1/00015* (2013.01); *H04W 12/69* (2021.01)

(58) Field of Classification Search
  USPC .............................. 358/1.15, 1.14, 1.13, 1.1
  See application file for complete search history.

(56) References Cited

U.S. PATENT DOCUMENTS

| | | |
|---|---|---|
| 9,832,722 B2 | 11/2017 | Simiuchi |
| 10,264,522 B2 | 4/2019 | Simiuchi |
| 10,264,523 B2 | 4/2019 | Simiuchi |
| 2014/0368867 A1* | 12/2014 | Kim ..................... G06F 3/1292 |
| | | 358/1.15 |
| 2016/0198403 A1 | 7/2016 | Sumiuchi |
| 2017/0195237 A1* | 7/2017 | Parasmal ................ H04L 65/80 |
| 2020/0257480 A1* | 8/2020 | Asakura ................ G06F 3/1238 |

\* cited by examiner

INFORMATION PROCESSING APPARATUS THAT ESTABLISHES CONNECTION TO A COMMUNICATION APPATATUS, ENABLING A PREDETERMINED ACCESS POINT, CONTROL METHOD, AND NON-TRANSITORY COMPUTER-READABLE STORAGE MEDIUM STORING PROGRAM

BACKGROUND OF THE INVENTION

Field of the Invention

The present invention relates to an information processing apparatus that connects communication between apparatuses, a control method, and a non-transitory computer-readable storage medium storing a program.

Description of the Related Art

A technique by which an information processing apparatus, such as a smartphone or the like, establishes a connection to a communication apparatus, such as a printer or the like, and communicates information related to an access point via the connection is known.

Japanese Patent Laid-Open No. 2016-127545 discloses that, after establishing a connection with a communication apparatus by using an SSID of the communication apparatus, information related to an access point is communicated and setting of a connection mode to the communication apparatus is performed.

As a technique for establishing a connection between an information processing apparatus and a communication apparatus and communicating information related to an access point via the connection becomes popular, the convenience of establishing a connection between the information processing apparatus and the communication apparatus needs to be improved.

SUMMARY OF THE INVENTION

The present invention provides an information processing apparatus that improves the convenience of establishing a connection between the information processing apparatus and a communication apparatus, a control method, and a non-transitory computer-readable storage medium storing a program.

The present invention in its first aspect provides an information processing apparatus that includes a predetermined program and an Operating System (OS) different from the predetermined program, comprising: an instruction unit configured to execute, on the OS, an instruction for connecting the information processing apparatus with a communication apparatus that has enabled a predetermined access point which includes identification information including both a specific character string and a character string other than the specific character string by notifying the OS of the specific character string; and a communication unit configured to communicate, in a case in which a connection is established between the information processing apparatus and the communication apparatus that has enabled the predetermined access point, information related to another access point different from the predetermined access point via the connection between the information processing apparatus and the communication apparatus that has enabled the predetermined access point.

The present invention in its second aspect provides a control method of an information processing apparatus that includes a predetermined program and an Operating System (OS) different from the predetermined program, the method comprising: executing, on the OS, an instruction for connecting the information processing apparatus with a communication apparatus that has enabled a predetermined access point which includes identification information including both a specific character string and a character string other than the specific character string by notifying the OS of the specific character string; and communicating, in a case in which a connection is established between the information processing apparatus and the communication apparatus that has enabled the predetermined access point, information related to another access point different from the predetermined access point via the connection between the information processing apparatus and the communication apparatus that has enabled the predetermined access point.

The present invention in its third aspect provides a non-transitory computer-readable storage medium storing a program for causing a computer of an information processing apparatus having an Operating System (OS) to execute, on the OS, an instruction for connecting the information processing apparatus with a communication apparatus that has enabled a predetermined access point which includes identification information including both a specific character string and a character string other than the specific character string by notifying the OS of the specific character string; and communicate, in a case in which a connection is established between the information processing apparatus and the communication apparatus that has enabled the predetermined access point, information related to another access point different from the predetermined access point via the connection between the information processing apparatus and the communication apparatus that has enabled the predetermined access point.

According to the present invention, the convenience of establishing a connection between an information processing apparatus and a communication apparatus can be improved.

Further features of the present invention will become apparent from the following description of exemplary embodiments with reference to the attached drawings.

DESCRIPTION OF THE EMBODIMENTS

Figure 1:
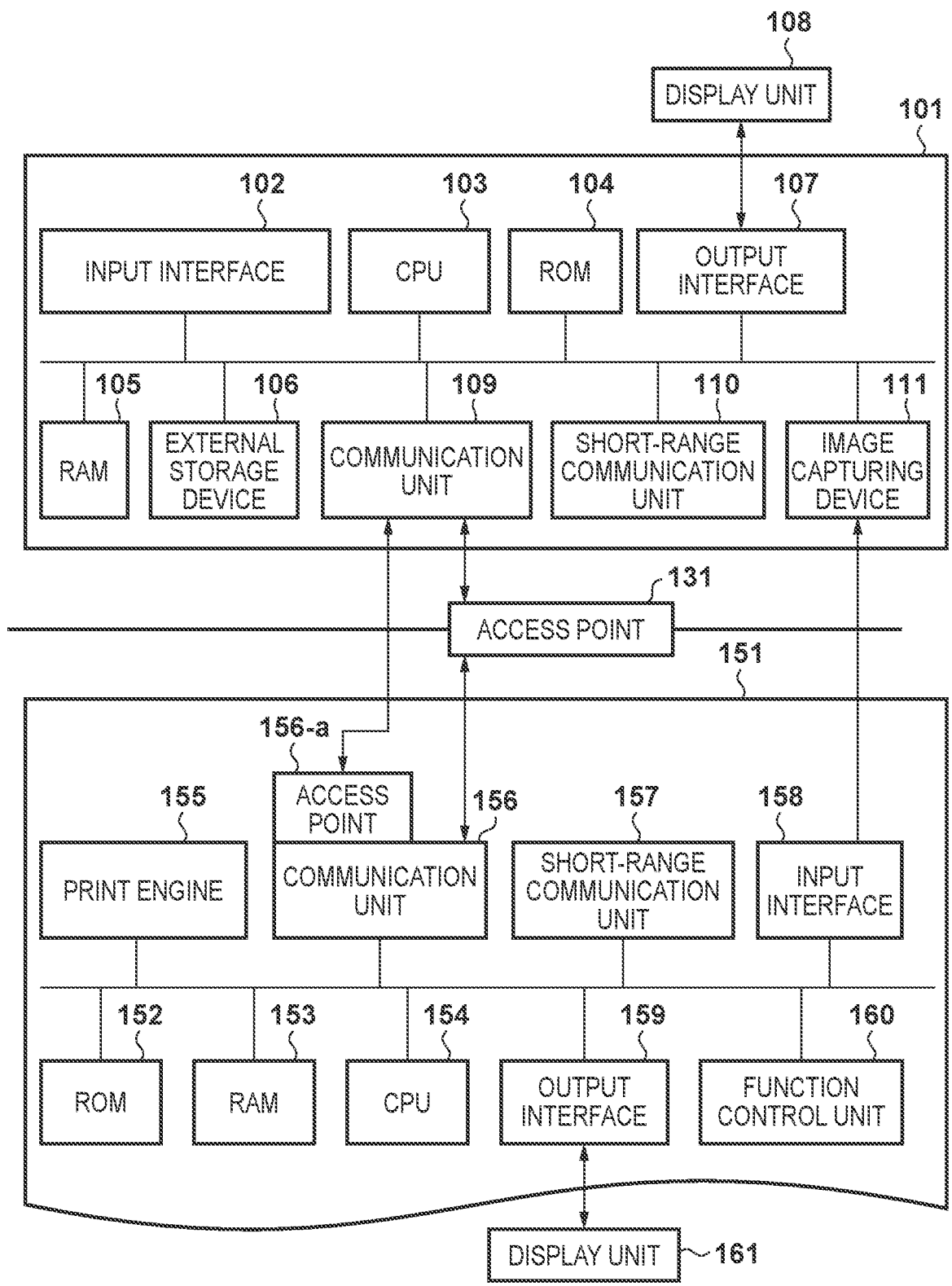
FIG. 1 is a block diagram showing the arrangement of a system that includes an information processing apparatus and a communication apparatus.

Hereinafter, embodiments will be described in detail with reference to the attached drawings. Note, the following embodiments are not intended to limit the scope of the claimed invention. Multiple features are described in the embodiments, but limitation is not made of an invention that requires all such features, and multiple such features may be combined as appropriate. Furthermore, in the attached drawings, the same reference numerals are given to the same or similar configurations, and redundant description thereof is omitted.

First Embodiment

An information processing apparatus and a communication apparatus included in a communication system according to this embodiment will be described. Although a smartphone is exemplified as the information processing apparatus in this embodiment, the present invention is not limited to this, and various kinds of apparatuses such as a portable terminal, a notebook PC, a tablet terminal, a PDA (Personal Digital Assistant), a digital camera, and the like can be used. In addition, although a printer is exemplified as a communication apparatus in this embodiment, the present invention is not limited to this, and various kinds of apparatuses can be used as long as it is an apparatus that can perform wireless communication with an information processing apparatus. For example, in the case of a printer, an inkjet printer, a full color laser beam printer, a monochrome printer, and the like can be used. Furthermore, the communication apparatus need not only be a printer but also may be a copy machine, a facsimile device, a portable terminal, a smartphone, a notebook PC, a tablet terminal, a PDA, a digital camera, a music playback device, a television, a smart speaker, or the like. Other than these apparatuses, the present invention is also applicable to a multifunction peripheral including a plurality of functions such as a copy function, a FAX function, a printing function, and the like.

The arrangement of a system that includes an information processing apparatus according to this embodiment and a communication apparatus that can communicate with the information processing apparatus will be described first with reference to FIG. 1. Although the following arrangement will be exemplified in this embodiment, this embodiment is applicable to an apparatus that is capable of communicating with a communication apparatus and is not limited to the arrangement described in FIG. 1.

A terminal apparatus 101 is an information processing apparatus according to this embodiment. The terminal apparatus 101 includes an input interface 102, a CPU 103, a ROM 104, a RAM 105, an external storage device 106, an output interface 107, a display unit 108, a communication unit 109, a short-range communication unit 110, and an image capturing device 111. In this embodiment, the terminal apparatus 101 will be exemplified by a smartphone.

The input interface 102 is an interface for accepting data inputs and operation instructions from a user, and is formed by a physical keyboard, buttons, a touch panel, or the like. Note that it may be arranged so that the output interface 107 (to be described later) and the input interface 102 will have the same arrangement and the same arrangement will be used to make outputs from a screen and to accept an operation from the user.

The CPU 103 is a system control unit and generally controls the overall terminal apparatus 101. The ROM 104 stores permanent data such as control programs and data tables to be executed by the CPU 103, an embedded Operating System (to be referred to as an OS hereinafter) program, and the like. In this embodiment, each control program stored in the ROM 104 will perform software execution control such as scheduling, task switching, interrupt processing, and the like under the management of the embedded OS stored in the ROM 104.

The RAM 105 is formed by an SRAM (Static Random Access Memory) that requires a backup power supply. Note that since the RAM 105 holds data by a primary cell (not shown) for data backup, it can store important data such as program control variables and the like without volatility. A memory area for storing the setting information of the terminal apparatus 101, the management data of the terminal apparatus 101, and the like is also provided in the RAM 105. In addition, the RAM 105 is also used as the main memory and the work memory of the CPU 103.

The external storage device 106 includes a connection setting application (to be referred to as a connection setting app hereinafter) that provides a connection setting function. The external storage device 106 includes various kinds of programs such as a print information generation program that generates print information which is interpretable by a communication apparatus 151, an information exchange control program for exchanging information with the communication apparatus 151 with which the information processing apparatus is connected via the communication unit 109, and the like. Also, the external storage device 106 stores various kinds of information to be used by these programs and image data obtained via other information processing apparatuses and the Internet.

The output interface 107 is an interface that controls the display unit 108 to display data and perform notification of the state of the terminal apparatus 101.

The display unit 108 is formed by an LED (light emitting diode), an LCD (a liquid crystal panel), and the like, and displays data and performs notification of the state of the terminal apparatus 101. Note that it may be arranged so that input from the user can be accepted via the display unit 108 by providing a virtual keyboard which includes keys such as a numerical value input key, a mode setting key, a enter key, a cancel key, a power key, and the like on the display unit 108.

The communication unit 109 executes data communication by connecting with an apparatus such as the communication apparatus 151 or the like. For example, the communication unit 109 can directly communicate with the communication apparatus 151 by wireless communication or communicate with the communication apparatus 151 via an external access point (an access point 131 (to be referred to as the AP 131 hereinafter)) present outside the communication apparatus 151 and the terminal apparatus 101. An access point is an apparatus that constructs a network, and is an apparatus that determines the communication channel to be used in the communication performed in the constructed network. Although this embodiment assumes that Wi-Fi (Wireless Fidelity®) is used as the wireless communication method of the communication unit 109, Bluetooth Classic® or the like may also be used. In addition, for example, a device such as a wireless LAN router or the like is used as the AP 131. Note that in this embodiment, a method in which the terminal apparatus 101 and the communication apparatus 151 directly connect with each other without the intervention of an external access point will be referred to as a direct connection method. Also, a method in which the terminal apparatus 101 and the communication apparatus 151 connect with each other via an external access point will be referred to as an infrastructure connection method.

The short-range communication unit 110 is an arrangement for executing data communication by setting a short-range wireless connection with an apparatus such as the communication apparatus 151 or the like, and performs communication by a communication method different from that by the communication unit 109. The short-range communication unit 110 can connect with a short-range communication unit 157 included in the communication apparatus 151. Note that Bluetooth Low Energy (BLE), Bluetooth Classic, Wi-Fi Aware, or the like can be used as the communication method of the short-range communication unit 110.

The image capturing device 111 is an apparatus that converts an image captured by an image capturing element into digital data. The digital data is temporarily stored in the RAM 105. Subsequently, the digital data is converted into data of a predetermined image format by a program executed by the CPU 103 and the converted data is stored as image data in the external storage device 106.

The communication apparatus 151 is a communication apparatus according to this embodiment. The communication apparatus 151 includes a ROM 152, a RAM 153, a CPU 154, a print engine 155, a communication unit 156, the short-range communication unit 157, an input interface 158, an output interface 159, a function control unit 160, and a display unit 161.

The communication unit 156 executes data communication by connecting with an apparatus such as the terminal apparatus 101 or the like. Although Wi-Fi will be used as the wireless communication method of the communication unit 156 in this embodiment, a method such as Bluetooth Classic or the like can also be used. Note that the communication unit 156 includes, as an access point in the communication apparatus 151, an access point 156a for connecting with an apparatus such as the terminal apparatus 101 or the like. Note that the access point 156a can connect with the communication unit 109 of the terminal apparatus 101. Note that the communication unit 156 may directly communicate with the terminal apparatus 101 via the access point 156a or communicate with the terminal apparatus 101 via the AP 131. The access point 156a may also be hardware that functions as an access point or the communication unit 156 may operate as the access point 156a by using software which will allow the communication unit to function as an access point. The access point in the communication apparatus 151 may be formed by a plurality of access points that have different pieces of identification information (for example, SSIDs (Service Set Identifiers)) and passwords. In this embodiment, assume that the access point in the communication apparatus 151 includes a connection setting AP (to be described later).

The RAM 153 is formed by an SRAM or the like which requires a backup power supply. Note that since the RAM 153 holds data by being supplied with power from a primary cell (not shown) for data backup, it can store important data such as program control variables and the like without volatility. Also, the RAM 153 is used as the main memory and the work memory of the CPU 154. The RAM 153 can also temporarily store, for example, as a reception buffer, the print information received from the terminal apparatus 101 or the like and store various kinds of information.

The ROM 152 stores permanent data such as control programs and data tables to be executed by the CPU 154, an OS program, and the like. In this embodiment, each control program stored in the ROM 152 will perform software execution control such as scheduling, task switching, interrupt processing, and the like under the management of the embedded OS stored in the ROM 152. In addition, a memory area for storing data, such as the setting information of the communication apparatus 151, the management data of the communication apparatus 151, and the like, which need to be held even when power is not supplied, is also provided in the ROM 152.

The CPU 154 is a system control unit and generally controls the overall communication apparatus 151. The print engine 155 outputs a print result by forming an image on a print medium such as a print sheet or the like by using a printing agent such as ink or the like based on information stored in the RAM 153 or a print job received from the terminal apparatus 101 or the like. At this time, since a transmitted data amount of a print job transmitted from the terminal apparatus 101 or the like is large and requires high-speed communication, it may be arranged so that the print job will be received via the communication unit 156 which can communicate at a higher speed than the short-range communication unit 157.

The short-range communication unit 157 is arranged to perform a short-range wireless connection with an apparatus such as the terminal apparatus 101 or the like. Note that Bluetooth Low Energy (BLE), Bluetooth Classic, Wi-Fi Aware, or the like can be used as the communication method of the short-range communication unit 157.

The input interface 158 is an interface for accepting data inputs and operation instructions from the user, and is formed by a physical keyboard, buttons, a touch panel, or the like. Note that it may be arranged so that the output interface 159 (to be described later) and the input interface 158 will have the same arrangement and the same arrangement will be used to make outputs from a screen and to accept an operation from the user. The output interface 159 is an interface that controls the display unit 161 to display data, perform notification of the state of the communication apparatus 151, and display information. The function control unit 160 performs management related to control of functional operations such as determining whether to operate functions of the communication apparatus 151 simultaneously and the like.

The display unit 161 is formed by including an LED (light emitting diode), an LCD (a liquid crystal panel), and the like, and displays data and performs notification of the state of the communication apparatus 151. Note that it may be arranged so that input from the user can be accepted via the display unit 161 by providing a virtual keyboard which includes keys such as a numerical value input key, a mode setting key, a enter key, a cancel key, a power key, and the like on the display unit 161.

<Wi-Fi Communication (P2P (Peer to Peer) Mode)>

To establish a connection (to be referred to as a P2P connection hereinafter) by the P2P method in a communication operation by Wi-Fi, the communication apparatus 151 according to this embodiment operates by a P2P mode (a software AP mode or a Wi-Fi Direct (WFD) mode). Note that in this embodiment, the P2P connection indicates a wireless connection mode in which apparatuses directly connect with each other without the intervention of an external apparatus such as the AP 131 or the like. While operating in the P2P mode, the communication apparatus 151 operates as a master device in the network to which the communication apparatus 151 belongs. The P2P mode includes the WFD mode and the software AP mode to be described below.

Note that WFD is a standard defined by the Wi-Fi Alliance. The terminal apparatus 101 and the communication apparatus 151 as WFD supporting devices can use WFD to directly perform a wireless connection with each other without the intervention of another access point. An apparatus that is a WFD supporting device and performs the role of an access point (master station) will be particularly referred to as a group owner. A mode for executing the P2P connection by WFD will be referred to as the WFD mode.

The communication apparatus 151 also has a software access point (software AP) to operate as an access point. When the communication apparatus 151 enables (activates) the software AP in the communication apparatus 151, the terminal apparatus 101 can connect with the software AP not by WFD but by normal Wi-Fi. By connecting in this way, the terminal apparatus 101 and the communication apparatus 151 can directly perform a wireless connection with each other without the intervention of another access point. A mode for executing the P2P connection by operating by enabling the software AP in the communication apparatus 151 will be referred to as the software AP mode. Note that the software AP in the communication apparatus 151 will be disabled when the software AP mode stops, and the communication apparatus 151 will be set in a state in which it cannot perform a P2P connection with another apparatus by using the software AP.

Since the communication apparatus 151 will operate as the master device in the P2P mode, the communication apparatus 151 can determine which communication channel is to be used in the communication by the P2P mode. For example, if the infrastructure mode and the P2P mode are to be operated in parallel, the communication apparatus 151 will perform control to use the communication channel used in the communication by the infrastructure mode for the communication by the P2P mode. In addition, for example, the communication apparatus 151 may preferentially select, as the channel to be used in the communication by the P2P mode, the communication channel used in the connection with the AP 131 than another channel.

In addition, the connection information (an SSID or a password) for connecting with the communication apparatus 151 by the P2P mode can be changed arbitrarily by user operation or the like on the operation unit included by the communication apparatus 151.

<Wi-Fi Communication (Infrastructure Mode)>

To establish a connection (to be referred to as an infrastructure connection hereinafter) by the infrastructure method in the communication by Wi-Fi, the communication apparatus 151 according to this embodiment will operate by the infrastructure mode. Note that in this embodiment, an infrastructure connection indicates a mode in which an external apparatus such as the AP 131 that generally controls the network operates as a master device and the apparatuses wirelessly connect with each other via the master device. While operating in the infrastructure mode, the communication apparatus 151 operates as a slave device in the network to which the communication apparatus 151 belongs.

The communication apparatus 151 and the terminal apparatus 101 will connect with each other via the AP 131 by the infrastructure mode, and communication via the AP 131 becomes possible between the communication apparatus 151 and the terminal apparatus 101. Note that the channel to be used in the communication by the infrastructure mode here is, for example, a channel of a frequency band (5.0 Ghz band or the like) other than the 2.4 GHz band.

Note that in order to communicate with the communication apparatus 151 via the AP 131, the terminal apparatus 101 needs to recognize that the communication apparatus 151 belongs to a network which is formed by the AP 131 and to which the terminal apparatus 101 belongs. Hence, for example, the terminal apparatus 101 transmits a search signal via the AP 131 on the network to which the terminal apparatus 101 belongs, and confirms the communication (connection) with the communication apparatus 151.

In this embodiment, a state in which the terminal apparatus 101 and the communication apparatus 151 are simply connected with the same AP will be determined to be in an infrastructure connection state. That is, in an infrastructure connection state, the terminal apparatus 101 and the communication apparatus 151 need only be connected with the same AP and need not recognize that the partner apparatus belongs to the network to which the self-apparatus belongs.

In this embodiment, when obtaining information for setting command communication and performing a P2P connection with the communication apparatus 151 in the connection setting processing, the P2P connection for connection setting between the terminal apparatus 101 and the communication apparatus 151 is used. As the P2P connection for connection setting in this embodiment, a connection by Wi-Fi (a connection by the communication unit 109 and the communication unit 156) is used. However, a connection by BLE (a connection by the short-range communication unit 110 and the short-range communication unit 157) may be used as the P2P connection for connection setting.

The connection setting processing using the connection by Wi-Fi will be described next. Note that a communication method other than Wi-Fi or BLE such as, for example, Bluetooth Classic or the like may be used as the P2P connection for connection setting. After an infrastructure connection or a P2P connection is established between the terminal apparatus 101 and the communication apparatus 151 by Wi-Fi by the connection setting processing, communication can be performed between the terminal apparatus 101 and the communication apparatus 151 via the established network connection. For example, the terminal apparatus 101 can transmit, to the communication apparatus 151 via the established connection, a print job to cause the communication apparatus 151 to execute printing or a scan job to cause the communication apparatus 151 to execute scanning. More specifically, if the established connection is the infrastructure connection, a job will be transmitted via an external access point, and if the established connection is a P2P connection, a job will be transmitted via an internal access point of the communication apparatus 151.

<Connection Setting Mode>

In this embodiment, the communication apparatus 151 can operate in the connection setting mode. The connection setting mode is a mode for performing the connection setting of the self-apparatus by executing setting command communication with the terminal apparatus 101. Note that setting commands include an infrastructure setting command and a P2P setting command in this embodiment. The infrastructure setting command is a command for causing the communication apparatus 151 to execute a connection setting operation for establishing an infrastructure connection between the communication apparatus 151 and the terminal apparatus 101. On the other hand, the P2P connection is a command for causing the communication apparatus 151 to execute a connection setting operation for establishing a P2P connection between the communication apparatus 151 and the terminal apparatus 101. The trigger for the communication apparatus 151 to start operating in the connection setting mode can be, for example, the pressing of a connection setting mode button by the user or the initial activation (powering on) of the communication apparatus 151 after arrival. The connection setting mode button may be a hardware button provided in the communication apparatus 151 or may be a virtual button displayed on the display unit 161 by the communication apparatus 151.

Upon starting an operation by the connection setting mode, the communication apparatus 151 enables both Wi-Fi communication and BLE communication. For example, as the processing for enabling the Wi-Fi communication, the communication apparatus 151 enables an AP (a connection setting AP) dedicated for the connection setting mode included in the communication apparatus 151. As a result, the communication apparatus 151 is set in a state that allows the P2P connection to be established with the terminal apparatus 101 by Wi-Fi. The connection information (the SSID and password) for connecting with the connection setting AP is stored in advance in the connection setting app installed in the terminal apparatus 101. Hence, the connection information to be used to connect with the connection setting AP is recognized in advance by the terminal apparatus 101. In this embodiment, in contrast to the connection information of an AP which is enabled by the P2P mode, the connection information for connecting with the connection setting AP cannot be changed arbitrarily by the user. By connecting with the communication apparatus 151 which is operating in the connection setting mode, the terminal apparatus 101 will be able to execute setting command communication with the communication apparatus 151. Note that in the connection setting mode, the communication apparatus 151 may connect with the terminal apparatus 101 by using Wi-Fi direct (WFD) instead of using the normal Wi-Fi. That is, the communication apparatus 151 may operate as a group owner and receive a setting command from the terminal apparatus 101 by communication by WFD.

The communication apparatus 151 also starts, as the processing for enabling the BLE communication, transmitting the advertising information. As a result, the communication apparatus 151 changes to a state in which a connection with the terminal apparatus 101 can be established by BLE. Note that in this embodiment, the communication apparatus 151 will be set in a state that can receive a BLE pairing request for a predetermined period since the BLE communication has been enabled. When the communication apparatus 151 receives a BLE pairing request during the predetermined time, paring with the apparatus which is the transmission source of the pairing request is performed to establish the BLE connection. If a BLE pairing request is not received during the predetermined period, the communication apparatus 151 may disable the BLE communication.

After enabling both the Wi-Fi communication and the BLE communication by the connection setting mode, the communication apparatus 151 receives the setting commands via these communication methods, and executes processing corresponding to each received setting command.

<Connection Setting Processing Using Wi-Fi>

Figure 2:
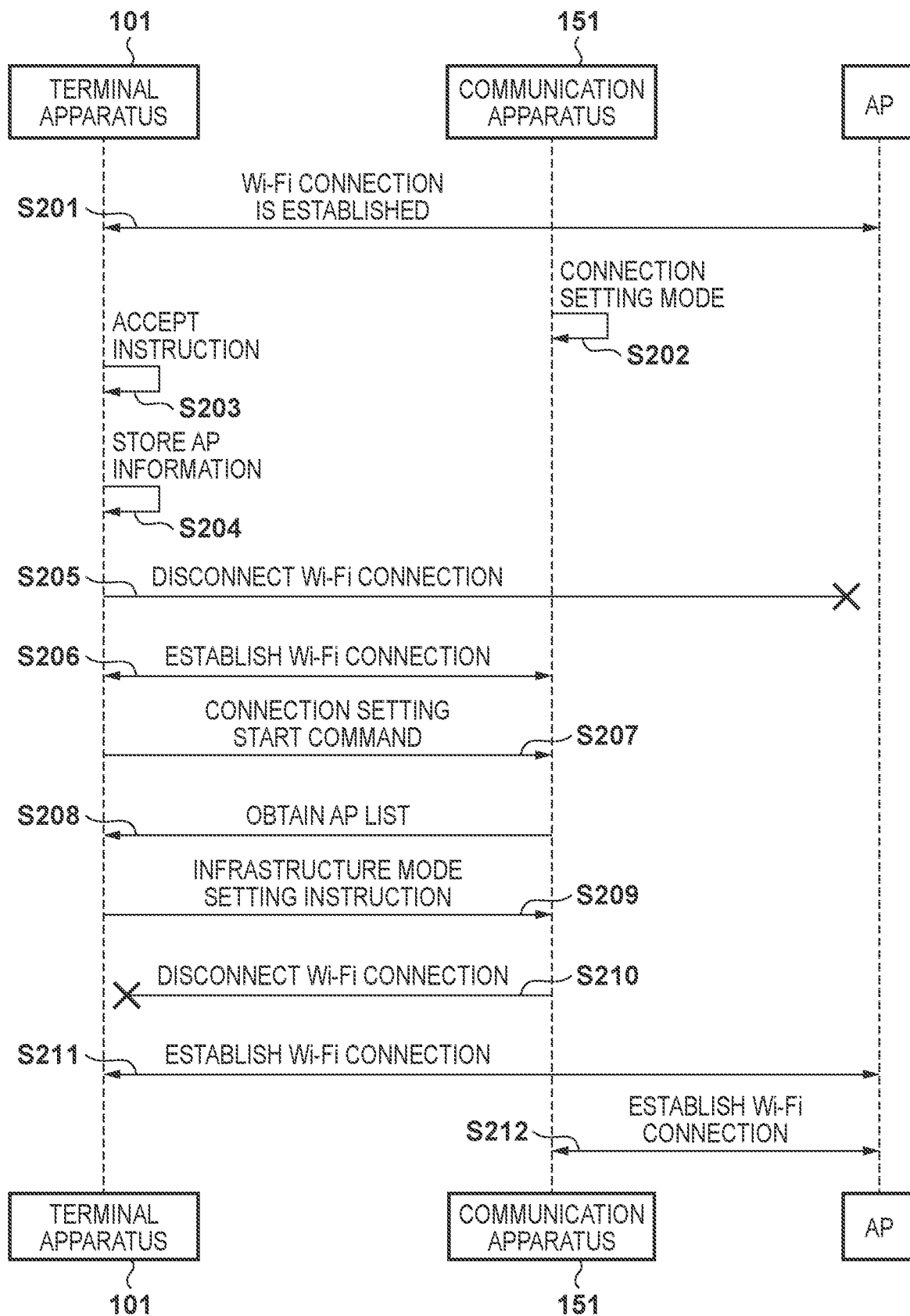
FIG. 2 is a sequence chart showing processing executed by each apparatus in connection setting processing.

FIG. 2 is a sequence chart showing processing to be executed by each apparatus in the connection setting processing using Wi-Fi. Each process of FIG. 2 is implemented in each apparatus by causing the CPU to read out a program stored in the memory to the RAM and to execute the program.

In S201, the terminal apparatus 101 and the AP 131 is connected by Wi-Fi. In S202, the communication apparatus 151 starts operating in the connection setting mode. The connection setting mode is a mode for executing the connection setting processing in the communication apparatus 151.

Upon starting an operation by the connection setting mode, the communication apparatus 151 enables an AP (a connection setting AP) dedicated for the connection setting mode included in the communication apparatus 151. As a result, the communication apparatus 151 is set in a state that allows a P2P connection to be established with the terminal apparatus 101 by Wi-Fi. The connection information (the SSID and the password) for connecting with the connection setting AP is held in advance by the connection setting app installed in the terminal apparatus 101, and the connection information to be used to connect with the connection setting AP is recognized in advance by the terminal apparatus 101. In this embodiment, in contrast to the connection information of an AP which is enabled by the P2P mode, the connection information for connecting with the connection setting AP cannot be arbitrarily changed by the user.

Note that upon starting the operation by the connection setting mode, the communication apparatus 151 further enables the BLE function and starts transmitting the advertising information. As a result, the communication apparatus 151 will change to a state which allows a connection to be established with the terminal apparatus 101 by BLE.

In S203, the terminal apparatus 101 accepts, from the user, a connection setting processing execution instruction via a user interface screen displayed on the display unit 108 by the connection setting app. In S204, the terminal apparatus 101 stores, in the memory, the information related to the AP (for example, the AP 131) with which it is connected at the time when the connection setting processing execution instruction is accepted. Assume that the AP with which the terminal apparatus 101 is connected when the connection setting processing execution instruction is received is the AP 131 hereinafter. Information related to the AP 131 is, for example, the connection information (the SSID and the password) for connecting with the AP 131 and information related to the frequency and the channel used for the connection with the AP 131.

In S205, the terminal apparatus 101 disconnects the Wi-Fi connection with the AP 131. In S206, the terminal apparatus 101 uses the connection information for connecting with the connection setting app recognized in advance, and establishes a Wi-Fi connection with the connection setting app in the communication apparatus 151. As a result, the terminal apparatus 101 temporarily establishes a P2P connection by Wi-Fi with the communication apparatus 151.

In S207, the terminal apparatus 101 transmits a start command of the connection setting processing to the communication apparatus 151 via the Wi-Fi connection. Note that since an AP list (to be described later) will be received after the start command of the connection setting processing has been transmitted, the start command of the connection setting processing performs the role of an AP list request command in this embodiment.

In S208, the communication apparatus 151 searches for an access point with which the self-apparatus can connect by Wi-Fi. The communication apparatus 151 subsequently transmits, as a search result, the list (the AP list) of access points with which the self-apparatus can connect by Wi-Fi to the terminal apparatus 101 via the Wi-Fi connection. That is, the terminal apparatus 101 obtains the AP list via the Wi-Fi connection. Note that the access point search timing is not limited to this timing, and may be, for example, the timing immediately after the start of the operation by the connection setting mode or the like.

In S209, the terminal apparatus 101 transmits the infrastructure setting command to the communication apparatus 151 via the Wi-Fi connection. The infrastructure setting command includes the connection information for connecting with an access point to connect with the communication apparatus 151. For example, if the AP 131 stored in the memory in S204 is included in the AP list, the access point with which the communication apparatus 151 is to be connected will be the AP 131 stored in the memory in S204. Also, for example, if the AP 131 stored in the memory in S204 is not included in the AP list, the access point with which the communication apparatus 151 is to be connected will be an access point selected by the user from the AP list. Assume here that the access point with which the communication apparatus 151 is to be connected will be the AP 131 stored in the memory in S204. Note that at this time, the terminal apparatus 101 may accept user input related to additional connection information (such as a password or the like) for connecting with the AP 131, add this additional connection information to the connection information, and transmit the combined pieces of connection information as the infrastructure setting command to the communication apparatus 151.

In S210, the terminal apparatus 101 disconnects the P2P connection with the communication apparatus 151 by Wi-Fi. In S211, the terminal apparatus 101 uses the connection information for connecting with the AP 131 stored in the memory in S204 and reconnects with the AP 131 by Wi-Fi.

In S212, the communication apparatus 151 uses, based on the infrastructure setting command received in S209, the connection information for connecting with the AP 131 which was received in S209, and connects with the AP 131 by Wi-Fi. As a result, the communication apparatus 151 starts operating in the infrastructure mode, and an infrastructure connection via the AP 131 is established between the terminal apparatus 101 and the communication apparatus 151.

Note that although a mode in which the infrastructure setting command is transmitted in S209 has been described above, the present invention is not limited to this mode. For example, a P2P setting command may be transmitted. In such a case, the communication apparatus 151 that has received the P2P setting command will transmit, to the terminal apparatus 101, connection information for connecting with the communication apparatus 151 operating in the P2P mode. The connection information includes, for example, an SSID of an access point enabled while the communication apparatus 151 is operating in the P2P mode and a password for connecting with this access point. Note that the access point enabled while the communication apparatus 151 is operating in the P2P mode is different from the access point enabled while the communication apparatus 151 is operating in the connection setting mode. That is, assume that the SSID of the access point enabled while the communication apparatus 151 is operating in the P2P mode will be different from the SSID of the access point enabled while the communication apparatus 151 is operating in the connection setting mode. The communication apparatus 151 subsequently starts the operation by the P2P mode and enables the corresponding access point. The terminal apparatus 101 subsequently uses the received connection information to connect with the communication apparatus 151 operating in the P2P mode.

<Processing for Searching for Communication Apparatus 151 Operating in Connection Setting Mode>

As described above, in this embodiment, the terminal apparatus 101 connects with the communication apparatus 151 which is operating in the connection setting mode. Hence, the terminal apparatus 101 needs to search for the communication apparatus 151 which is operating in the connection setting mode. The processing (search processing) for searching for the communication apparatus 151 which is operating in the connection setting mode will be described here.

For example, some embedded Operating Systems such as iOS and the like do not provide, to an application on the terminal apparatus 101, a list of access points discovered by a search executed by the embedded OS. Hence, conventionally, a setting app corresponding to the embedded OS is activated separately to select an apparatus to be a target of the connection setting processing by a connection setting app. The user needs to select, on the setting app, the access point included by the apparatus to be the target of the connection setting processing, and the selected access point and the terminal apparatus 101 are connected. Subsequently, the connection setting app is made to operate in the foreground again, and the apparatus including the access point with which the terminal apparatus 101 had been connected is selected as the apparatus to be the target of the connection setting processing by the connection setting app. This kind of a mode is problematic in that it requires the user to perform troublesome operations.

To reduce such troublesome operations, the following mode can be considered. For example, a mode in which all of the apparatuses which are to be the targets of connection setting processing by the connection setting app are arranged to include access points with identical SSIDs. It is a mode in which the connection setting app stores the identical SSID in advance and instructs the OS to establish a connection between the terminal apparatus 101 and each access point with the identical SSID.

However, this mode will require all of the apparatuses which are to be targets of connection setting processing by the connection setting app to include access points with identical SSIDs, thus problematically reducing the security related to the connectivity of each apparatus.

This embodiment will describe a mode that solves such problems. More specifically, in this embodiment, each apparatus that is to be a target of the connection setting processing by the connection setting app will be arranged to include an access point that has an SSID which includes both a character string which is common to the apparatuses and a character string which is unique to the individual apparatus. The connection setting app will store in advance the character string common to the apparatuses in the connection setting app. That is, the connection setting app need not accept input of the common character string from the user. The connection setting app will instruct the OS to search for an access point which has an SSID including at least the common character string. Subsequently, the connection setting app will instruct the OS to establish a connection between the discovered access point and the terminal apparatus 101. By setting such a mode, a highly convenient connection setting operation that does not require the user to perform a troublesome operation can be executed while suppressing the reduction in security related to connectivity of each apparatus to be the target of the connection setting processing.

Figure 3:
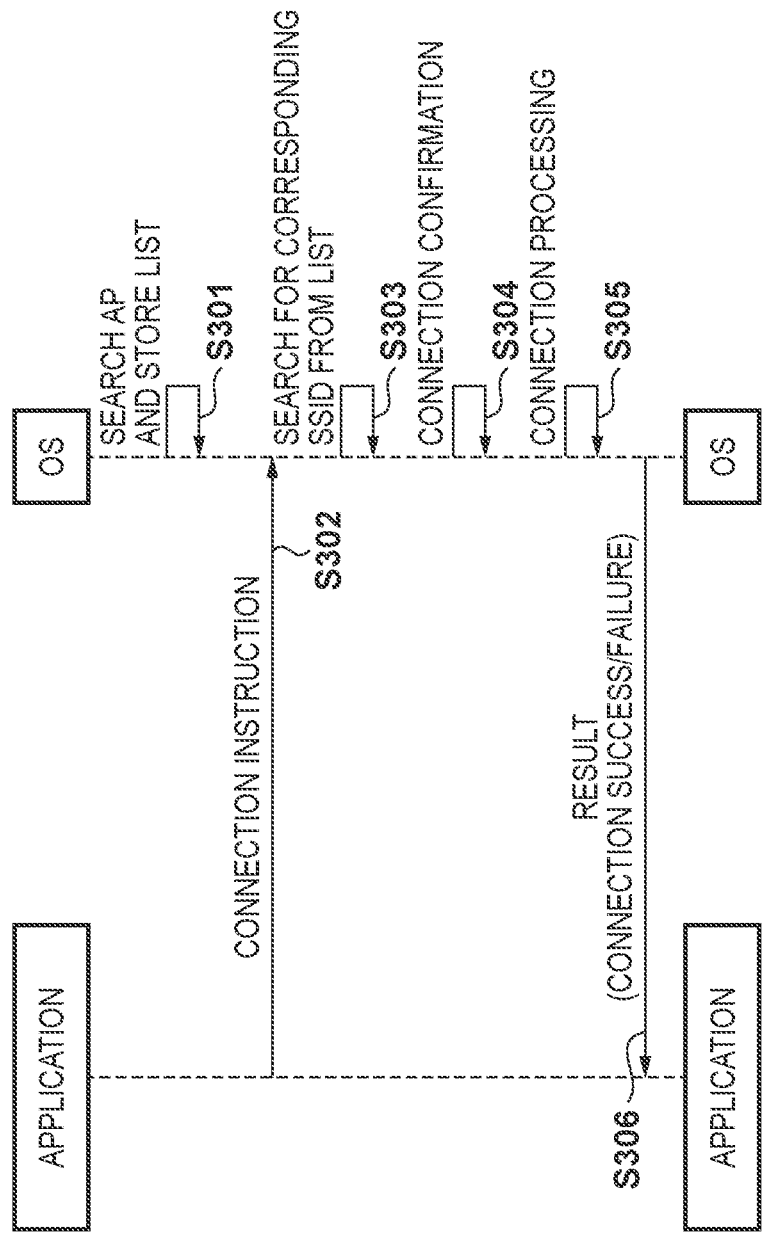
FIG. 3 is a sequence chart showing processing executed by an application and an embedded OS.

FIG. 3 is a sequence chart showing the processing to be executed by the connection setting app installed in the terminal apparatus 101 and the embedded OS stored in the ROM 104 in the processing for searching the communication apparatus 151 which is operating in the connection setting mode. Note that this processing is executed in a state in which the connection setting app is operating in the foreground and a screen by the connection setting app is displayed on the display unit 108.

In S301, the embedded OS searches for an access point with which the terminal apparatus 101 can connect. More specifically, the embedded OS searches for each access point, which is present in the periphery of the terminal apparatus 101 and is transmitting a beacon including an SSID and the like, by receiving the beacon. The embedded OS stores, in the memory, a list (AP list) of access points discovered from the search. Note that the search for an access point may be suitably executed at an arbitrary timing by the embedded OS.

In S302, the connection setting app issues, to the embedded OS, a connection instruction for instructing a connection with an access point. Note that two kinds of connection instructions can be issued to the embedded OS. The first connection instruction is an instruction that designates a given character string and causes the terminal apparatus 101 to connect with an access point which has an SSID that completely matches the designated character string. An SSID that completely matches the designated character string is, in other words, an SSID that includes only the designated character string and does not include a character string other than the designated character string. The second connection instruction is an instruction that designates a given character string and causes the terminal apparatus 101 to connect with an access point which has an SSID that includes at least the designated character string. An SSID that includes at least the designated character string is, in other words, an SSID that includes both the designated character string and a character string other than the designated character string. In this embodiment, assume that the latter kind of a connection instruction will be performed in S302. Assume that a specific character string is designated in the connection instruction. In this embodiment, a specific character string is a character string included in the SSID of an internal access point which has been enabled by the communication apparatus 151 operating in the connection setting mode. The specific character string is a character string commonly included in the SSIDs of the access points of the respective apparatuses which are to be the targets of the connection setting processing by the connection setting app. In other words, a character string other than the specific character string included in the SSID of the access point of each apparatus to be the target of the connection setting processing by the connection setting app will be different for each apparatus. Note that which communication apparatus 151 is to enable which of the access points including an SSID while operating in the connection setting mode will be determined based on, for example, the vendor, the model number, the apparatus type, or the like of the communication apparatus 151. For example, while operating in the connection setting mode, every apparatus (for example, a printer) of a predetermined kind provided by a vendor providing the connection setting app will enable an access point which has an SSID including a character string common to the apparatuses and a character string which differs for each apparatus. Also, at this time, the SSID designation method is not limited to designation based on the first characters of a character string, but suffices to be a method that can designate a portion of the character string. For example, the designation may be performed by designating the rear characters of a character string, designating a character string which including a wildcard character, a designation method using a regular expression, or the like. Note that if the second connection instruction has been accepted, the embedded OS can establish a connection between the terminal apparatus 101 and an access point which has an SSID that includes only the designated character string and does not include a character string other than the designated character string. In this embodiment, every apparatus which is to be the target of the connection setting processing by the connection setting app will enable an access point which has an SSID that includes both the designated character string and a character string other than the designated character string.

In S303, the embedded OS searches, from the AP list stored in the memory, for an access point which has the SSID that includes the specific character string designated by the connection setting app. If an access point which includes the SSID that includes the specific character string is discovered by this search, the embedded OS will specify the discovered access point as the connection target access point, and the process advances to S304. Note that a plurality of access points which have the SSID that includes the specific character string designated by the connection setting app may be present in the AP list in some cases. In such a case, for example, one access point determined by the priority order may be specified as the connection target access point. In such a case, the specific priority order may be determined based on the order in which the access point was discovered, the strength of frequency intensity, or the like. In this embodiment, if there are a plurality of access points which have the SSID that includes the specific character string designated by the connection setting app in the AP list, the access point at the top of the list among the corresponding access points will be specified. More specifically, the access point discovered first in the search by the embedded OS will be specified among the corresponding access points. On the other hand, if an access point which has the SSID that includes the specific character string is not discovered by the search, the embedded OS will notify the connection setting app that the access point which has the SSID that includes the specific character string could not be discovered, and end the processing.

In S304, the embedded OS displays, as a popup on a notification screen displayed by the connection setting app, a confirmation area for confirming the permission for connecting the terminal apparatus 101 to the access point specified as the connection target access point. For example, the SSID of the access point specified as the connection target access point will be displayed on the confirmation area. If the user has made, on the confirmation area, an input which indicates that the terminal apparatus 101 is permitted to connect with the access point, the embedded OS will advance to S305. On the other hand, if the user has made, on the confirmation area, an input which indicates that the terminal apparatus 101 is not permitted to connect with the access point, the embedded OS will end the processing without establishing a connection between the access point and the terminal apparatus 101. In also such a case, the embedded OS will notify the connection setting app that it has failed to establish a connection between the terminal apparatus 101 and the access point. Note that at this time, the embedded OS and the connection setting app may display an area to successfully establish a connection between the access point and the terminal apparatus 101. Such an area is, for example, an area including a message that prompts the user to bring the terminal apparatus 101 closer to an access point which has been arbitrarily selected by the user and is not the access point that has the SSID displayed on the confirmation screen. This is because an access point which is positioned in a location closer to the terminal apparatus 101 will be discovered earlier in the search by the embedded OS. Also, for example, it may be an area that includes a message that prompts the user to disable the access point which has the SSID displayed on the confirmation screen. Alternatively, for example, it may be an area that includes a message that prompts the user to connect, by using the setting application corresponding to the embedded OS, the terminal apparatus 101 with an access point which has been arbitrarily selected by the user and is not the access point that has the SSID displayed on the confirmation screen.

In S305, the embedded OS executes processing (connection processing) to establish a connection between the terminal apparatus 101 and the access point specified as the connection target access point. Note that the connection to be established by the connection processing is, in other words, a connection between the terminal apparatus 101 and the communication apparatus 151 that has enabled the access point specified as the connection target access point. In S306, the embedded OS transmits the execution result of the connection processing of S305 to the connection setting app. This execution result can include not only a status such as success/failure or the like, but also information such as the cause of the failure in the case of a failure. The connection setting app that received the execution result will display a screen indicating the execution result via the display unit 108 serving as the screen of the connection setting app. The execution of the processing of FIG. 3 will allow a Wi-Fi connection to be established between the terminal apparatus 101 and the connection setting AP in the communication apparatus 151 as described in S206.

<Processing of Connection Setting App>

Figure 4:
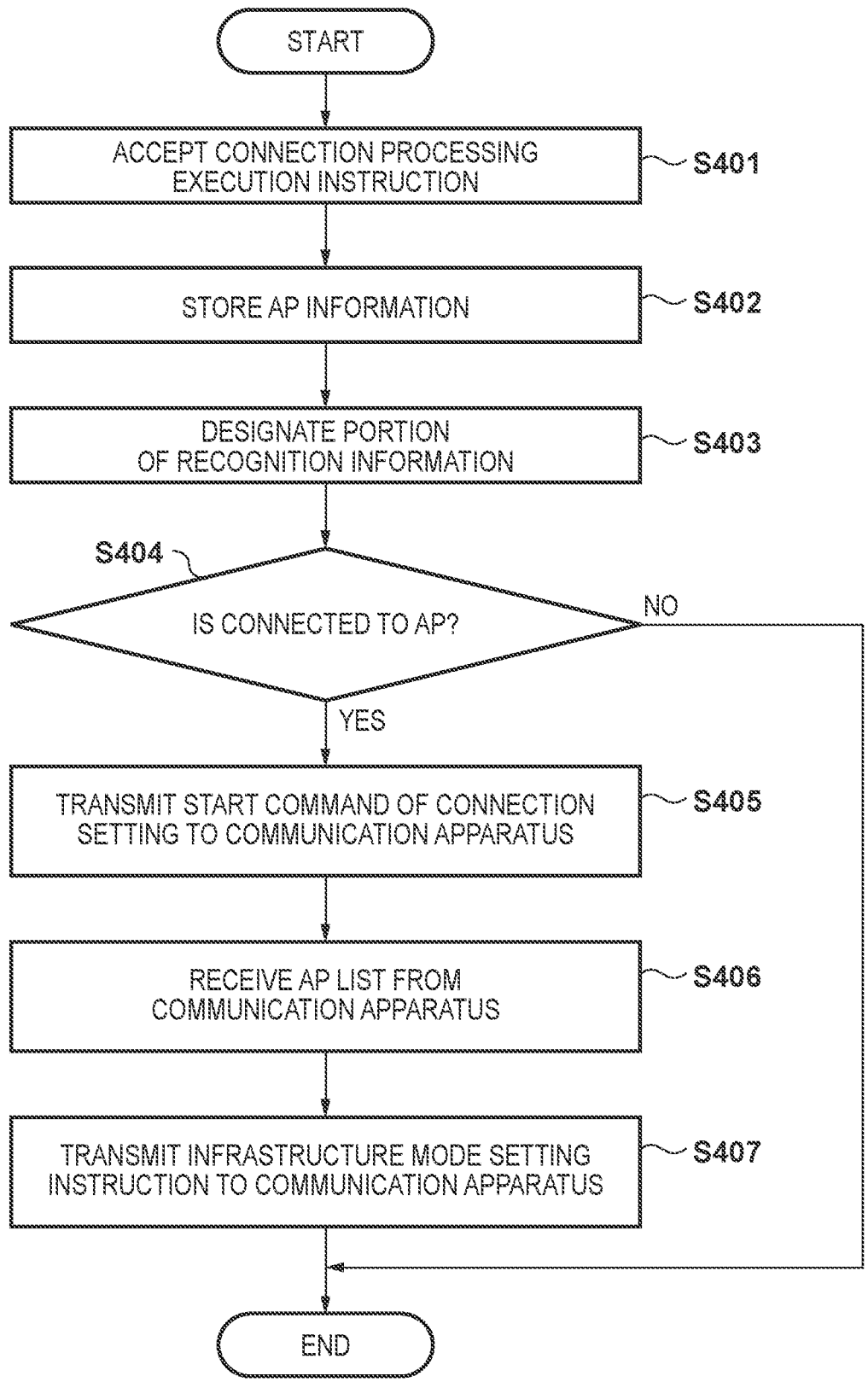
FIG. 4 is a flowchart showing communication control processing of a connection setting application.

FIG. 4 is a flowchart showing the processing to be executed by the connection setting app in the connection setting processing using Wi-Fi. The processing of FIG. 4 is implemented by, for example, the CPU 103 of the terminal apparatus 101 reading out the connection setting app from the ROM 104 and executing the connection setting app.

In step S401, the CPU 103 accepts a connection setting processing execution instruction from the user via the screen displayed on the display unit 108 by the connection setting app. This process corresponds to S203.

In step S402, the CPU 103 uses the connection setting app to store, in the memory, the information related to the AP (for example, the AP 131) with which the terminal apparatus 101 is connected when the execution instruction was received. This process corresponds to S204. Note that if the terminal apparatus 101 is not connected at this time, this process will be omitted.

In step S403, the CPU 103 causes the connection setting app to designate a specific character string to the embedded OS. The CPU 103 then instructs the embedded OS to establish a Wi-Fi connection between the terminal apparatus 101 and an access point which has an SSID that includes at least the specific character string. This process corresponds to that of S302.

In step S404, the CPU 103 causes the connection setting app to determine whether the Wi-Fi connection between the terminal apparatus 101 and an access point which has an SSID that satisfies the designated condition has been successfully established. An SSID that satisfies the designated condition is an SSID that includes the specific character string. This process is executed based on the notification of the execution result from the embedded OS. If the CPU is notified from the OS that the access point which has the SSID that includes the specific character string could not be discovered, it will be determined that the Wi-Fi connection failed to be established. If is determined that the Wi-Fi connection has failed to be established, the processing of FIG. 4 ends. On the other hand, if it is determined that the Wi-Fi connection has been successfully established, the process advances to step S405.

In step S405, the CPU 103 causes the connection setting app to transmit, to the communication apparatus 151 via the established Wi-Fi connection, a start command of the connection setting processing. This process corresponds to S207. Note that as described above, the start command of the connection setting processing performs the role of an AP list request command.

In step S406, the CPU 103 causes the connection setting app to obtain the AP list from the communication apparatus 151 as a response to the command transmitted in step S405. This process corresponds to S208. If the AP list cannot be received at this time, the processing of FIG. 4 may be ended upon displaying an error message on the display unit 108.

In step S407, the CPU 103 causes the connection setting app to transmit the infrastructure setting command to the communication apparatus 151 via the Wi-Fi connection by the terminal apparatus 101. This process corresponds to S209. Note that as described above, the infrastructure setting command includes the connection information to cause the communication apparatus 151 to connect with the connection target access point.

Note that in step S407, the CPU 103 may cause the connection setting app to transmit the P2P setting command. In such a case, the CPU 103 will cause the connection setting app to receive, from the communication apparatus 151, the connection information for connecting with the communication apparatus 151 which is operating in the P2P mode, and use the connection information to instruct the embedded OS to newly establish a Wi-Fi connection between the terminal apparatus 101 and the access point enabled by the communication apparatus 151 which is operating in the P2P mode. Note that at this time, the connection setting app can completely specify, by the connection information, the character string included in the SSID of the access point enabled by the communication apparatus 151 which is operating in the P2P mode. Hence, the first connection instruction will be issued to the OS by designating all of the character string included in the SSID of the access point enabled by the communication apparatus 151 which is operating in the P2P mode. As a result, the Wi-Fi connection between the terminal apparatus 101 and the access point enabled by the communication apparatus 151 which is operating in the connection setting mode will be disconnected. Subsequently, a Wi-Fi connection is established between the terminal apparatus 101 and the access point enabled by the communication apparatus 151 which is operating in the P2P mode.

Note that in step S407, whether the infrastructure setting command or the P2P setting command is to be transmitted may be determined arbitrarily. For example, the user may select, on the selection screen, which of the infrastructure connection and the P2P connection is to be established during the acceptance operation of the connection setting processing execution instruction, and control may be performed so that a setting command corresponding to the selected connection will be transmitted. Also, for example, if the terminal apparatus 101 is connected with any one of the access points when the connection setting processing execution instruction is accepted, control may be performed so that the infrastructure setting command will be transmitted. If the terminal apparatus 101 is not connected with any one of the access points when the connection setting processing execution instruction is accepted, control may be performed so that the P2P setting command will be transmitted.

In this manner, in this embodiment, each apparatus that is to be the target of the connection setting processing by the connection setting app is arranged to include an access point which has an SSID that includes both a character string common to the apparatuses and a character string unique to the individual apparatus. Also, the connection setting app does not obtain the AP list from the OS. That is, the connection setting app does not execute a search, in the AP list, for an access point which has an SSID that includes at least the common character string. Instead, the connection setting app will instruct the OS to search, in the AP list which has been obtained by the OS, for an access point which has an SSID that includes at least the common character string. Subsequently, the connection setting app will instruct the OS to establish a connection between the terminal apparatus 101 and the access point which has the SSID that includes at least the common character string. By setting such a mode, it will be possible to establish a connection between the terminal apparatus 101 and an arbitrary access point without requiring the AP list to be obtained on the side of the connection setting app. In addition, a highly convenient connection setting operation that does not require the user to perform a troublesome operation can be executed while the reduction in security related to connectivity of each apparatus to be the target of the connection setting processing is suppressed.

Second Embodiment

This embodiment will describe points different from the first embodiment hereinafter. In this embodiment, if an OS does not discover an access point which has an SSID that includes a specific character string, a connection setting app will execute polling at predetermined interval by transmitting an access point search instruction and a connection instruction. This kind of arrangement will increase the possibility that connection setting processing will be completed even if, for example, the start of the operation in the connection setting mode by a communication apparatus 151 is delayed and the OS cannot discover an access point which has an SSID that includes the specific character string in the first search operation.

Figure 5:
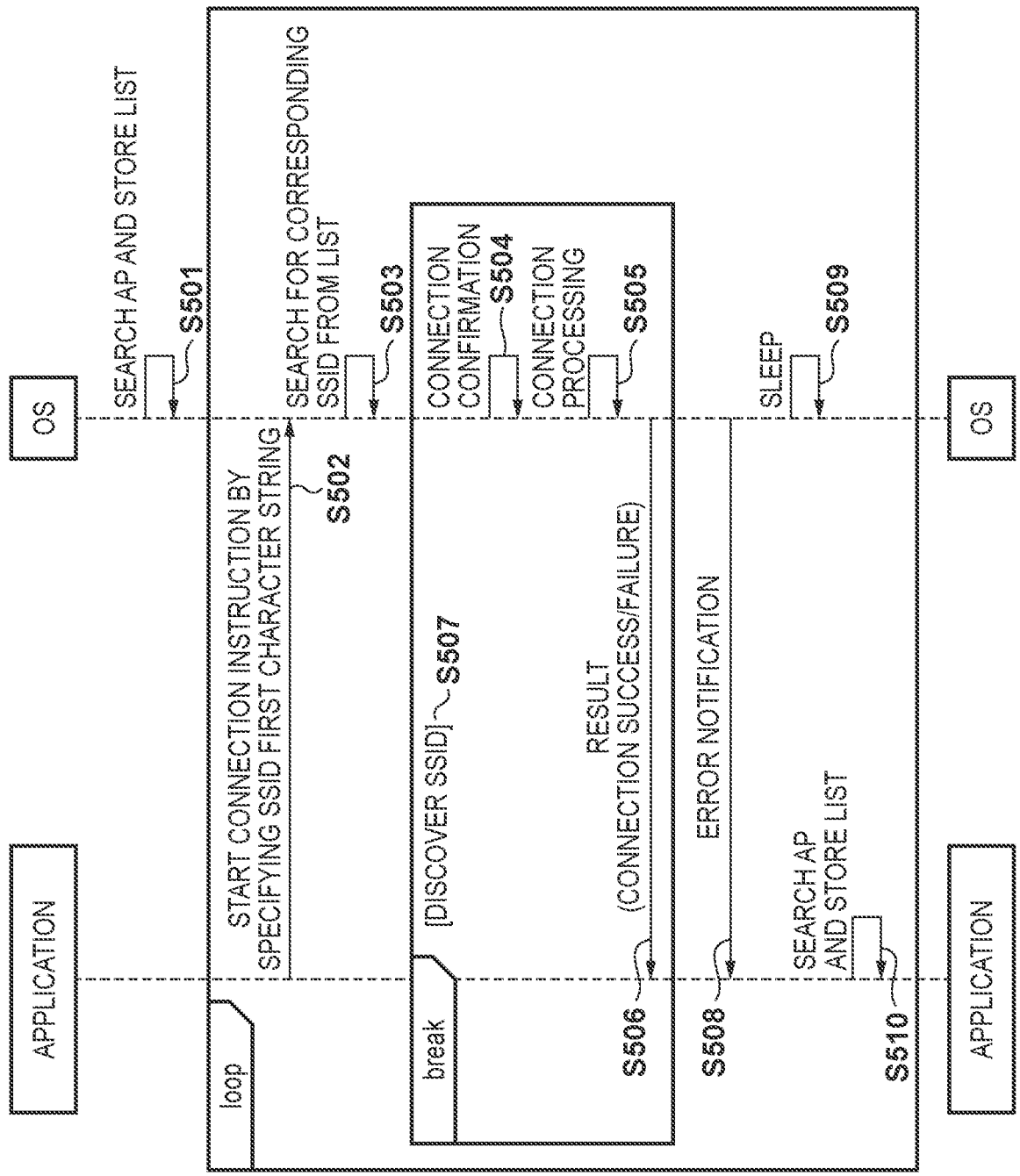
FIG. 5 is a sequence chart showing processing executed by an application and an embedded OS.

FIG. 5 is a sequence chart showing processing for searching for the communication apparatus 151 which is operating in the connection setting mode.

In S501, an embedded OS searches for an access point with which a terminal apparatus 101 can connect. The embedded OS stores a list (AP list) of access points obtained from the search. This process is similar to that of S301.

In S502, the connection setting app designates a specific character string to instruct the embedded OS to establish a connection between the terminal apparatus 101 and the access point which has an SSID that includes the specific character string. This process is similar to that of S302.

In S503, the embedded OS searches, from the AP list stored in the memory, for the access point which has an SSID that includes the specific character string designated by the connection setting app. If the access point which has an SSID that includes the specific character string is discovered from this search, the embedded OS causes the process to advance to S504. If the access point which has an SSID that includes the specific character string is not discovered from this search, the embedded OS causes the process to advance to S508.

In S504, the embedded OS displays, via a display unit 108, an area for the user to confirm whether the terminal apparatus 101 can be connected with the access point discovered from the list by the search performed in S503. This process is similar to that of S304.

In S505, the embedded OS executes processing (connection processing) to establish a connection between the terminal apparatus 101 and the access point discovered from the list by the search performed in S503. This process is similar to that of S305. In S506, the embedded OS transmits the execution result of the connection processing of S505 to the connection setting app. The execution result at this time can include not only a status such as success/failure or the like, but also information such as the cause of the failure in the case of a failure. The connection setting app that received the execution result will display a screen indicating the execution result via the display unit 108 serving as the screen of the connection setting app. This process is similar to that of S306. Subsequently, a Wi-Fi connection is established between the terminal apparatus 101 and the connection setting AP in the communication apparatus 151 as described in S206.

On the other hand, in S508, the embedded OS transmits, to the connection setting app, a notification indicating the occurrence of an error due to the lack of discovery of the SSID. The connection setting app that received the error notification from the embedded OS will be set, in S509, to a sleep state for a predetermined time. After the predetermined time has elapsed and the sleep state is canceled, the processing is repeated again from S502. In S510, the embedded OS executes a process similar to that of S501 again. That is, the embedded OS will search for an access point with which the communication apparatus 151 can connect and store the result in the memory. This process is executed while the connection setting app is in the sleep state.

In this manner, according to this embodiment, if the OS cannot discover an access point which has an SSID that includes a specific character string, the connection setting app will execute polling at a predetermined interval. As a result, the possibility that the connection setting processing will be completed can be increased.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-053140, filed Mar. 24, 2020, which is hereby incorporated by reference herein in its entirety.

What is claimed is:

1. An information processing apparatus that includes a predetermined program and an Operating System (OS) different from the predetermined program, comprising:
   a memory containing instructions; and
   a processor for executing the instructions to
   execute, by the predetermined program, an instruction to the OS for connecting the information processing apparatus with a communication apparatus that has enabled a predetermined access point which includes identification information including both a specific character string and a character string other than the specific character string,
   wherein, the instruction is executed by designating the specific character string on the OS, and the specific character string is a character string included in identification information of a plurality of access points in common, the plurality of access points being enabled by a plurality of communication apparatuses provided by a predetermined vendor, the plurality of communication apparatuses including the communication apparatus; and
   communicate, in a case in which a connection between the information processing apparatus and the communication apparatus that has enabled the predetermined access point is established by the instruction executed by designating the specific character string on the OS, by the predetermined program, information related to a different access point from the predetermined access point and is positioned outside the information processing apparatus and outside the communication apparatus,
   wherein the information related to the different access point is communicated via the connection between the information processing apparatus and the communication apparatus that has enabled the predetermined access point.

2. The apparatus according to according to claim 1, wherein the predetermined program executes the instruction on the OS without obtaining, from the OS, information which has been searched for by the OS and is related to one or a plurality of access points with which the information processing apparatus can connect.

3. The apparatus according to claim 1, wherein the OS searches for one or a plurality of access points with which the information processing apparatus can connect, and
   in a case in which the instruction has been executed on the OS, the OS searches for the predetermined access point from the one or the plurality of access points discovered by the OS and with which the information processing apparatus can connect, and
   in a case in which the predetermined access point is discovered, the OS executes processing to connect the information processing apparatus with a communication apparatus that has enabled the predetermined access point.

4. The apparatus according to claim 3, wherein in a case in which a plurality of the predetermined access points are included in the one or the plurality of access points discovered by the OS and with which the information processing apparatus can connect, the OS executes processing to connect the information processing apparatus with the communication apparatus which has enabled one of the plurality of the predetermined access points.

5. The apparatus according to claim 4, wherein one of the plurality of the predetermined access points is an access point discovered first, among the plurality of the predetermined access points, in the search by the OS.

6. The apparatus according to claim 3, further comprising:
   an information display to display, in a case in which a plurality of the predetermined access points are included in the one or the plurality of access points discovered by the OS and with which the information processing apparatus can connect, information related to one of the plurality of the predetermined access points,
   wherein in a case in which an input for permitting a connection between the information processing apparatus and the communication apparatus that has enabled the predetermined access point corresponding to the displayed information is accepted from a user, the OS executes processing to connect the information processing apparatus with the communication apparatus that has enabled the predetermined access point corresponding to the displayed information, and
   in a case in which the input for permitting a connection between the information processing apparatus and the communication apparatus that has enabled the predetermined access point corresponding to the displayed information is not accepted from the user, the OS does not execute the processing to connect the information processing apparatus with the communication apparatus that has enabled the predetermined access point corresponding to the displayed information.

7. The apparatus according to claim 6, wherein in a case in which the input for permitting a connection between the information processing apparatus and the communication apparatus that has enabled the predetermined access point corresponding to the displayed information is not accepted from a user, a notification screen for notifying the user is displayed.

8. The apparatus according to claim 7, wherein the notification screen is at least one of a screen used to prompt the user to bring the information processing apparatus and the communication apparatus which has enabled an access point different from the predetermined access point corresponding to the displayed information closer to each other, a screen used to prompt the user to disable the predetermined access point corresponding to the displayed information, and a screen used to prompt the user to use a predetermined program of a setting application corresponding to the OS to connect the information processing apparatus with the communication apparatus which has enabled the access point different from the predetermined access point corresponding to the displayed information.

9. The apparatus according to claim 3, wherein the instructions are further executed to notify,
   in a case in which the predetermined access point is not included in the one or the plurality of access points discovered by the OS and with which the information processing apparatus can connect, that establishment of a connection between the information processing apparatus and the predetermined access point has failed.

10. The apparatus according to claim 3, wherein the instructions are further executed
to execute again, in a case in which the predetermined access point is not included in the one or the plurality of access points discovered by the OS and with which the information processing apparatus can connect, the instruction on the OS after the one or the plurality of access points with which the information processing apparatus can connect have been searched for again by the OS.

11. The apparatus according to claim 1, wherein
the information related to the different access point is transmitted from the information processing apparatus to the communication apparatus, and
in a case in which the information related to the different access point is transmitted to the communication apparatus, the communication apparatus executes processing to connect with the different access point.

12. The apparatus according to claim 11, wherein in a case in which a predetermined operation is performed on the information processing apparatus, the instruction is executed on the OS, and
the different access point is an external access point with which the information processing apparatus was connected when the predetermined operation was performed on the information processing apparatus.

13. The apparatus according to claim 11, wherein the different access point is an access point selected by a user from one or a plurality of external access points.

14. The apparatus according to claim 11, wherein the instructions are further executed
to obtain, from the communication apparatus via the connection between the information processing apparatus and the communication apparatus that has enabled the predetermined access point, information related to one or a plurality of external access points with which the communication apparatus can connect; and further comprising
a display to display a selection screen configured to allow a user to select at least one of the one or the plurality of external access points with which the communication apparatus can connect,
wherein the other access point is an access point selected by the user from the one or the plurality of external access points with which the communication apparatus can connect.

15. The apparatus according to claim 14, wherein in a case in which a predetermined operation is performed on the information processing apparatus, the instruction is executed on the OS,
in a case in which the one or the plurality of external access points with which the communication apparatus can connect includes an access point with which the information processing apparatus was connected when the predetermined operation was performed on the information processing apparatus, the different access point is the access point with which the information processing apparatus was connected when the predetermined operation was performed on the information processing apparatus, and
in a case in which the one or the plurality of external access points with which the communication apparatus can connect does not include the access point with which the information processing apparatus was connected when the predetermined operation was performed on the information processing apparatus, the selection screen will be displayed and the different access point will be an access point selected by the user from the one or the plurality of external access points with which the communication apparatus can connect.

16. The apparatus according to claim 1, wherein in a case in which a predetermined operation is performed on the information processing apparatus, the instruction is executed on the OS,
in a case in which the information processing apparatus is not connected with the different access point when the predetermined operation is performed, the different access point is an access point enabled by the communication apparatus,
the information related to the different access point is transmitted from the communication apparatus to the information processing apparatus, and
in a case in which the information related to the different access point is transmitted to the information processing apparatus, an instruction to connect the information processing apparatus with the communication apparatus which has enabled the different access point will be executed on the OS.

17. The apparatus according to claim 16, wherein the instruction to connect the information processing apparatus with the communication apparatus which has enabled the different access point is executed by designating a specific character string included in the information related to the different access point, and
the different access point includes the identification information which includes the specific character string but does not include a character string other than the specific character string.

18. The apparatus according to claim 1, wherein the instructions are further executed
to transmit, to the communication apparatus via the different access point, a print job for executing printing.

19. A control method of an information processing apparatus that includes a predetermined program and an Operating System (OS) different from the predetermined program, the method comprising:
executing, by the predetermined program, an instruction to the OS for connecting the information processing apparatus with a communication apparatus that has enabled a predetermined access point which includes identification information including both a specific character string and a character string other than the specific character string,
wherein, the instruction is executed by designating the specific character string on the OS, and the specific character string is a character string included in identification information of a plurality of access points in common, the plurality of access points being enabled by a plurality of communication apparatuses provided by a predetermined vendor, the plurality of communication apparatuses including the communication apparatus; and
communicating, in a case in which a connection between the information processing apparatus and the communication apparatus that has enabled the predetermined access point is established by the instruction executed by designating the specific character string on the OS, by the predetermined program, information related to a different access point from the predetermined access point and is positioned outside the information processing apparatus and outside the communication apparatus, wherein the information related to the different access point is communicated via the connection between the information processing apparatus and the communication apparatus that has enabled the predetermined access point.

20. A non-transitory computer-readable storage medium storing a program for causing a computer of an information processing apparatus having an Operating System (OS) to execute, by the predetermined program, an instruction to the OS for connecting the information processing apparatus with a communication apparatus that has enabled a predetermined access point which includes identification information including both a specific character string and a character string other than the specific character string, wherein, the instruction is executed by designating the specific character string on the OS, and the specific character string is a character string included in identification information of a plurality of access points in common, the plurality of access points being enabled by a plurality of communication apparatuses provided by a predetermined vendor, the plurality of communication apparatuses including the communication apparatus; and communicate, in a case in which a connection between the information processing apparatus and the communication apparatus that has enabled the predetermined access point is established by the instruction executed by designating the specific character string on the OS, by the predetermined program, information related to a different access point from the predetermined access point and is positioned outside the information processing apparatus and outside the communication apparatus, wherein the information related to the other access point is communicated via the connection between the information processing apparatus and the communication apparatus that has enabled the predetermined access point.

* * * * *